Sept. 8, 1964 W. J. ZABLE ETAL 3,148,369
ELECTRONIC ACQUISITION DEVICES FOR NARROW-BEAMWIDTH
TRACKING SYSTEMS
Filed April 7, 1959 7 Sheets-Sheet 1

INVENTOR.
Walter J. Zable
Robert V. Werner
William J. Thompson

BY

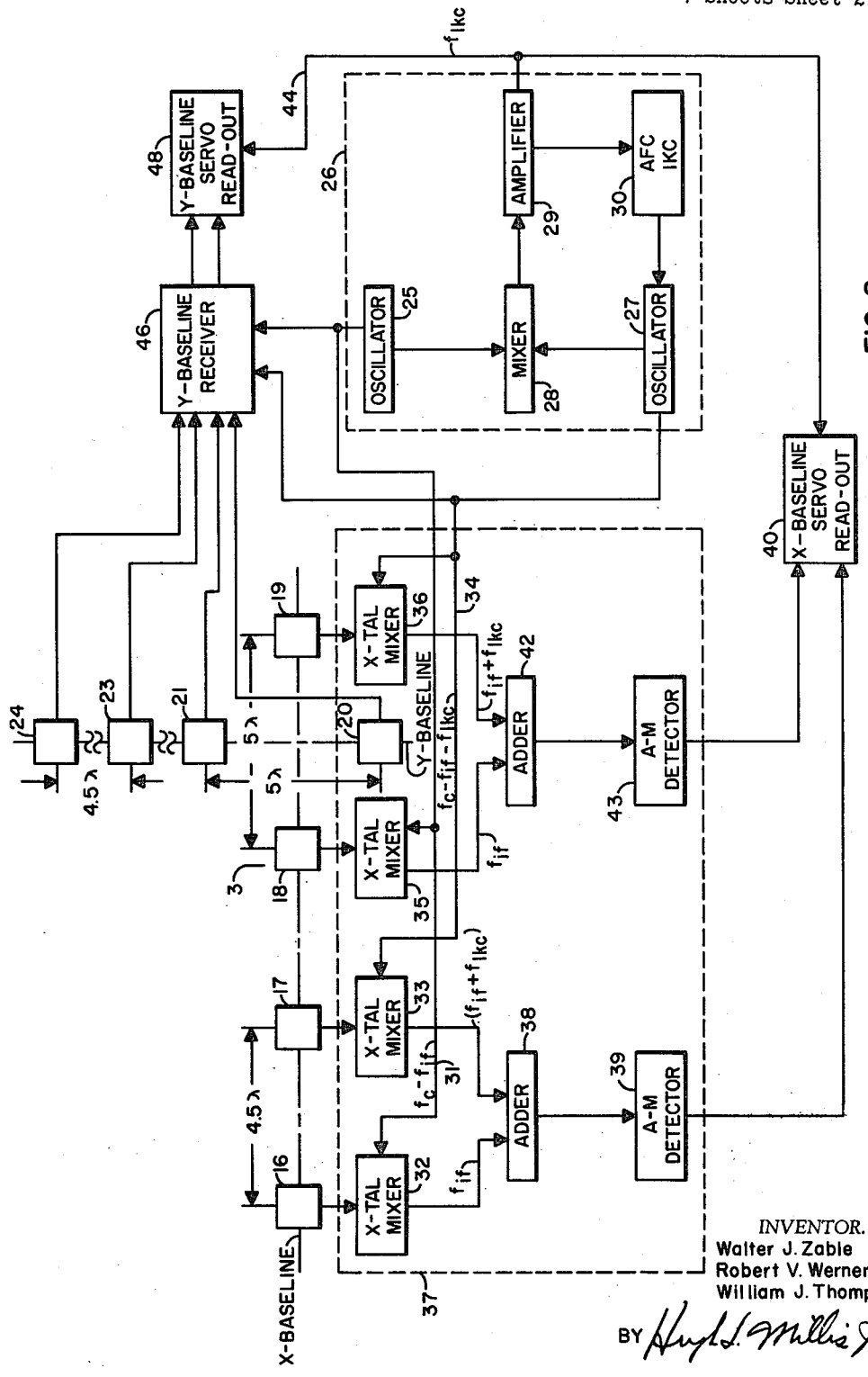

INVENTOR.
Walter J. Zable
Robert V. Werner
William J. Thompson

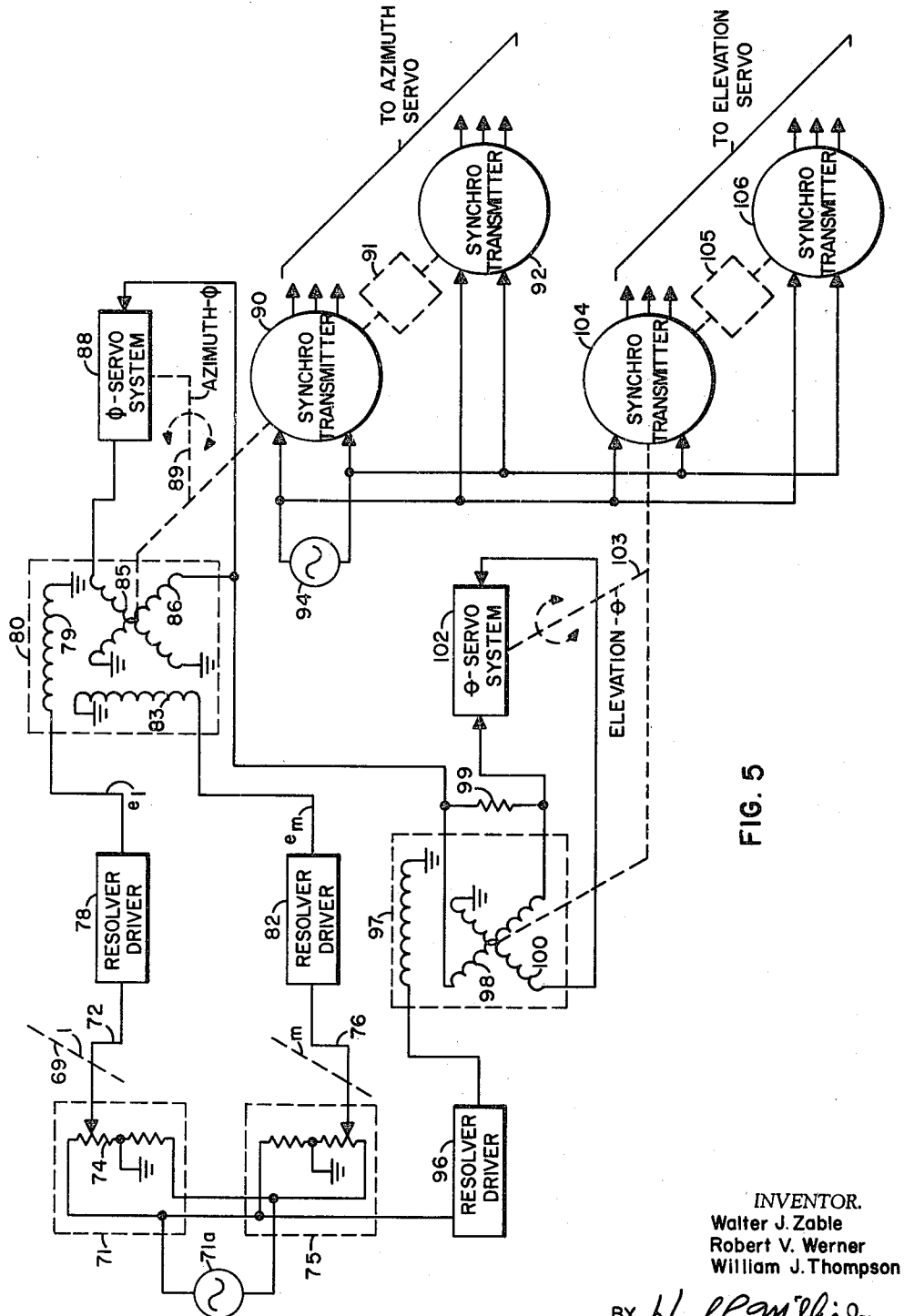

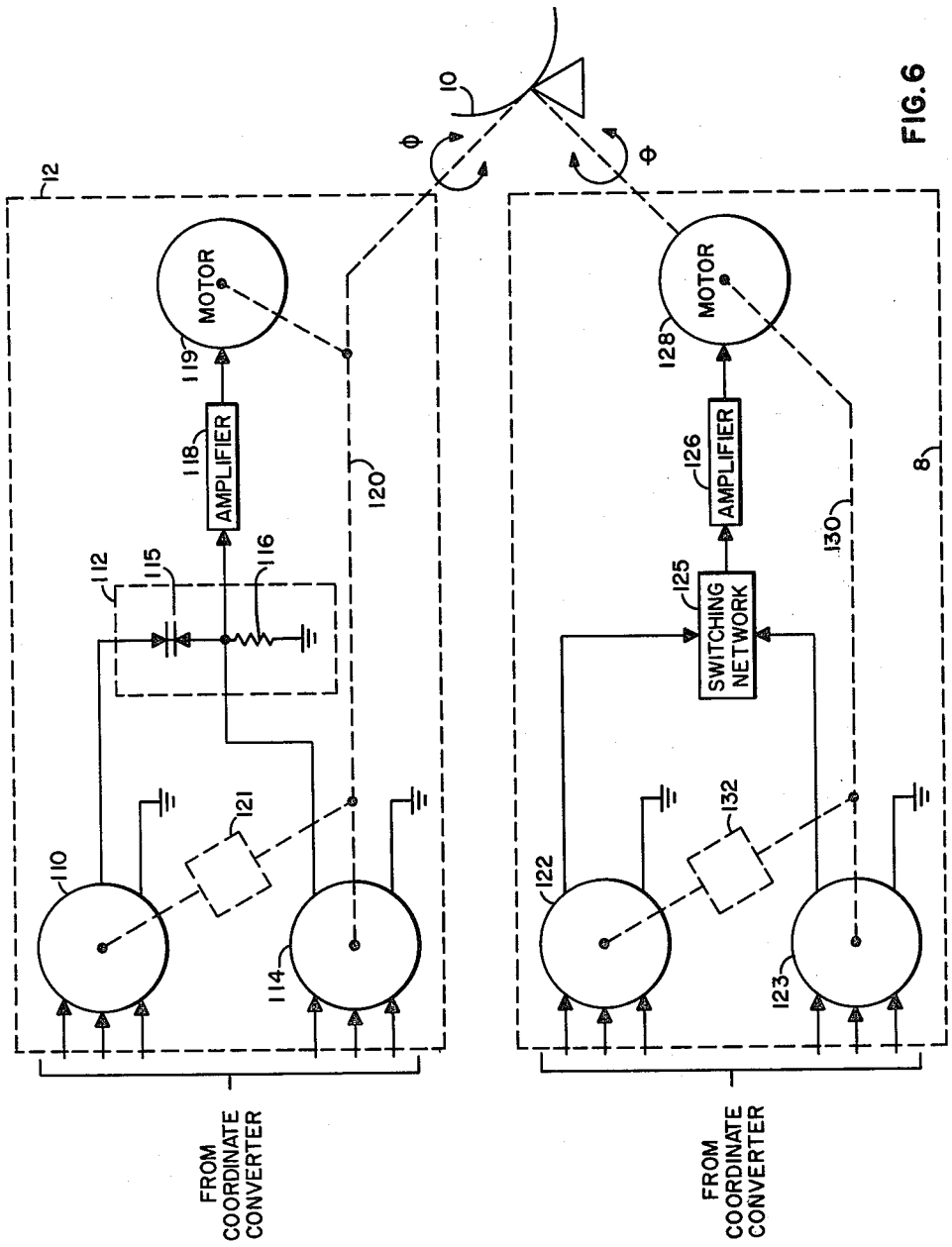

INVENTOR.
Walter J. Zable
Robert V. Werner
William J. Thompson

INVENTOR.
Walter J. Zable
Robert V. Werner
William J. Thompson 3,148,369
ELECTRONIC ACQUISITION DEVICES FOR NARROW-BEAMWIDTH TRACKING SYSTEMS
Walter J. Zable, San Diego, Robert V. Werner, La Mesa, and William J. Thompson, San Diego, Calif., assignors to Cubic Corporation, San Diego, Calif., a corporation of California
Filed Apr. 7, 1959, Ser. No. 804,757
13 Claims. (Cl. 343—117)

The present invention relates to electronic acquisition devices for narrow beamwidth tracking systems, and, more particularly, to electronic systems capable of determining the vector direction to a target craft and providing corresponding information to the driving servos of a radar or optical tracker such that its beam or line of sight may be directed toward the craft.

One major operational problem associated with employing narrow beamwidth tracking systems, i.e., radars and optical trackers, for tracking objects of interest, such as balloons, aircraft, missiles, etc., lies in the initial target acquisition. This problem arises primarily due to the very narrow beamwidth antennas required for tracking radars and the narrow field of view of the telescope employed in optical trackers. The narrow beamwidth antennas are required in radar systems to achieve accurate target position information and high signal-to-noise ratio echos from the target, and large optical amplifications are required in optical tracking systems in order to obtain tracking capabilities of reasonably sized objects to reasonable distances. These narrow beamwidth properties, in both cases, make initial lock-on or acquisition difficult, since, without other knowledge of the craft's position, the radar disc or telescope must systematically scan the sky until the target is located. If the scan rate is made too fast, in order to shorten the acquisition time, the chances of completely missing the target are increased. On the other hand, if the scan is made relatively slow, in order to insure acquisition, a considerable time lag may ensue before acquisition is accomplished, with the subsequent loss of valuable tracking data. Of course, this acquisition difficulty is greatly magnified by fast moving targets which pass rapidly through the scan sector, hence lessening the chance of their recognition.

The above-noted initial acquisition problems are completely eliminated by all system embodiments proposed in accordance with the present invention. Before describing the various embodiments, one technical aspect common to all embodiments is the employment of direction cosine measuring techniques generally taught in accordance with the co-pending U.S. application for patent entitled "A Multiple Target Tracking System," Serial Number 754,099, now Patent No. 2,976,530, filed August 8, 1958, to Robert V. Werner, Walter J. Zable, William J. Thompson and Arthur E. Noyes.

According to this technique, the target transmits a signal having a constant, known frequency which is received at an antenna system comprising, in its simplest form, two antenna pairs, the baselines of which are mutually perpendicular and bisecting. The phase difference of the target signal, measured between the two antennas of each pair, represents the direction cosine of the target's position measured from that baseline. The two direction cosines measured from the two crossed-baseline antenna systems, in turn, yield the equivalent of a direction vector pointing to the target.

In the most basic embodiment of the above technique, in accordance with the present invention, the antenna system is located in close proximity to the tracking system, and the pair of direction cosine signals are applied to a coordinate converter, employing analog computational techniques, which converts the input vector direction information into corresponding elevation and azimuth angle information. This is done in order that the output data will conform with the normal radar or optical tracking system servo coordinate system requirements. Then, elevation and azimuth servos are employed to drive their corresponding gimbal axes of the radar disc or optical tracking unit to the computed elevation and azimuth angle values. With this servoing accomplished, the radar disc or optical tracking axis will point in exact parallel with the direction vector determined by the direction cosine measuring system and its associated antenna system, hence providing for initial acquisition and for some requirements, continuous servoing information thereafter.

Another embodiment of the present invention assumes that both the direction vector measuring system and the tracking system are located on a shipboard, or, for that matter, on any body or platform undergoing continuous motion. With the coordinate converter azimuth and elevation servos employed as previously described, simultaneous target and shipboard movement may occur, and the elevation and azimuth axes of the tracking system will still be continuously driven to point at the target.

As a final embodiment, the coordinate converter noted in the first two embodiments, for transforming direction cosine information into azimuth and elevation angle information, is eliminated. This is accomplished by mounting the crossed-baseline antenna system on a gimbal-supported platform and separately driving each axis by an associated direction cosine unit such that the target-received signals on each antenna pair are exactly equal in phase. With this accomplished, both antenna baselines, and hence the platform, will be pointed normal to the target. Then, a pair of conventional servo drive units are coupled between the elevation and azimuth gimbal axes of the antenna platform and the tracking system such that the tracking system is driven to correspond to the antenna platform position. With this accomplished, the radar or optical system will point exactly parallel to the antenna platform and hence is enabled to continuously track the target craft in accordance with the platform movement.

It is accordingly, the principal object of the present invention to provide an omnidirectional electronic system capable of determining the vector direction to a moving target and transmitting appropriate directional servoing information to a narrow beamwidth tracking system for its acquisition and tracking purposes.

Another object of the present invention is to provide an electronic system capable of measuring a pair of direction cosines between it and a moving target, and transmitting azimuth and elevation information corresponding thereto to a narrow beamwidth tracking system for acquisition and tracking purposes.

Still another object of the present invention is to provide an electronic tracking system including an omnidirectional and a narrow beamwidth tracking system in close proximity where the direction information to the moving target is acquired by the omnidirectional system and transmitted to the narrow beamwidth system.

A further object of the present invention is to provide a servoing system capable of determining a pair of direction cosines to a moving target by connecting the pair of direction cosines into elevation and azimuth information for driving the corresponding axes of a narrow beamwidth radar or optical tracking unit to point at the target.

Another object of the present invention is to provide an electronic device, including a pair of antenna systems, which is capable of determining the direction cosine between each antenna system and a moving target and providing elevation and azimuth information based on the pair of resulting direction cosines to a narrow beamwidth radar or optical tracking system for acquisition purposes.

Still another object of the present invention is to provide an electronic system, including a pair of perpendicular bisecting antenna baselines, which receives a target-transmitted signal and determines, through phase-comparison techniques, two direction cosines to the target, one for each antenna baseline, and additionally provides azimuth and elevation position servo information of the target's location, based on the measured direction cosine values, to a narrow beamwidth target observation system for its subsequent acquisition and tracking purposes.

Still another object of the present invention is to provide an electronic system which transmits continuous information of the vector direction of a target craft's position to the servos driving an optical and radar tracking system, where the tracking system is mounted on a moving platform, such that the tracking system continuously points at the target craft regardless of the movement of the platform.

A further object of the present invention is to provide an electronic system for shipboard use which furnishes continuous target tracking information to the azimuth and elevation axes servos driving an optical or narrow beam radar tracking system by continuously determining a pair of direction cosines to the target through employment of phase-comparison techniques, and converting the pair of direction cosines into azimuth and elevation angle information for use by the corresponding servo units of the tracking system such that the tracking system points at the target regardless of shipboard motion.

A still further object of the present invention is to provide a system capable of producing tracking information of a target craft which continuously transmits a signal, the system including a pair of bisecting antenna baselines positioned on a controllable platform in which the phase difference of the target signal received on the antenna baselines is employed to control the platform position until a phase difference null is attained, at which time the platform surface is directed normal to the target.

Another object of the present invention is to provide a crossed-baseline antenna system positioned on a servo controlled platform in which phase-comparison techniques are employed to drive the platform such that it points normal to the position of a target being tracked and simultaneously drives a narrow beamwidth radar or optical tracking system such that its elevation and azimuth axes are directed in exact parallel with the corresponding platform axes.

Other objects, features and attendant advantages of the present invention will become more apparent to those skilled in the art as the following disclosure is set forth, including a detailed description of the preferred embodiment of the invention as illustrated in the accompanying sets of drawings, in which:

FIGURE 2 is in block diagrammatic form showing, in varying degrees of detail, the direction cosine measuring system of FIGURE 1;

FIGURE 5 shows, in block diagrammatic form, the coordinate converter of FIGURE 1;

FIGURE 6 shows, in block diagrammatic form, the azimuth and elevation drive units of FIGURE 1;

Figure 1:
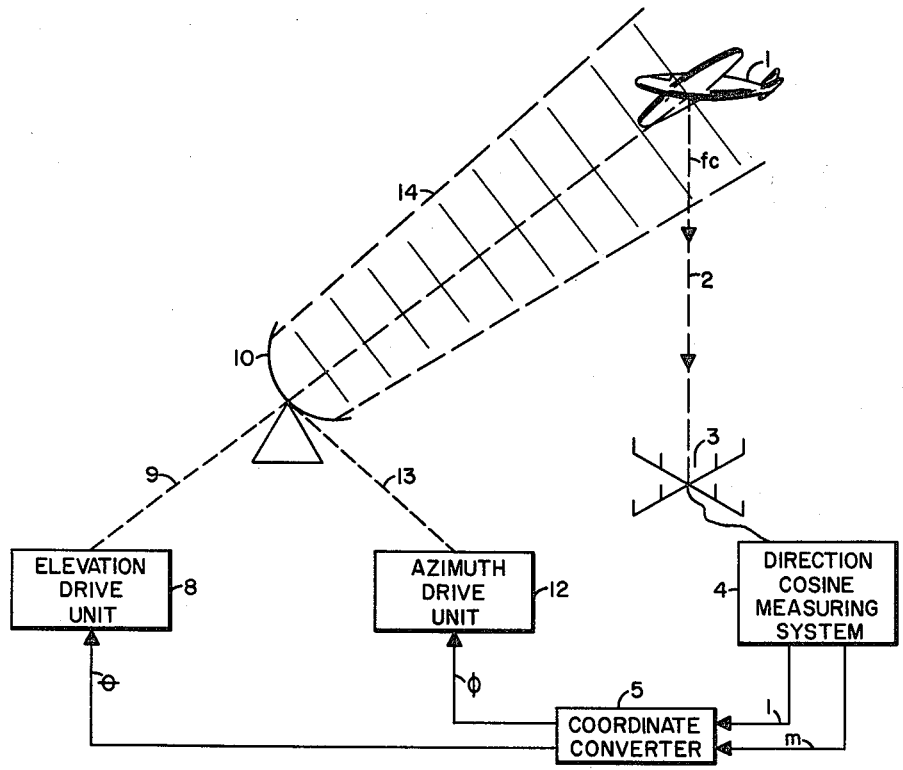
FIGURE 1 shows, in partly schematic and partly block diagrammatic form, the principal elements of one embodiment of the present invention.

Referring now to the drawings, wherein identical elements are given the same numerical designation, there is illustrated in FIGURE 1, in schematic form, one version of a target acquisition system in accordance with the present invention. The target vehicle, shown by way of example as an aircraft at 1, transmits a C.-W. signal of a fixed frequency, $f_c$, which is received by a crossed-baseline antenna system 3, shown later in detail in FIGURE 2. The direct path between the target-transmitted signal and antenna system 3 is indicated at 2. Antenna system 3 is coupled to a direction cosine measuring system 4, shown in detail in the following FIGURES 2 and 3. A pair of direction cosine output signals, $l$ and $m$, produced by system 4, are applied to a coordinate converter 5, shown in detail in the following FIGURE 5. Converter 5 produces a pair of output signals representing elevation and azimuth angles $\theta$ and $\Phi$, which are applied to an elevation servo 8 and an azimuth servo 12, respectively, associated with a narrow beamwidth tracking system, such as a radar, whose dish is indicated at 10. The output shaft of elevation servo 8 is indicated as a dotted line 9, driving the elevation axis of dish 10 to correspond to elevation angle $\theta$. In the same way, the output shaft of azimuth servo 12 is shown dotted at 13 to indicate its coupling to the azimuth axis of the radar dish for driving dish 10 to correspond to azimuth angle $\Phi$. Finally, the beam transmitted by the radar is indicated at 14, which, following acquisition, intercepts target vehicle 1, as shown.

In operation, each antenna within crossed-baseline system 3 receives the signal transmitted by the target vehicle. These antenna received signals are converted by direction cosine measuring system 4 into a pair of direction cosines, which, taken together, define the direction vector of the target relative to the antenna system. This information, appearing as direction cosine signals $l$ and $m$, is then converted by coordinate converter 5 into signals representing the radar coordinate angles of elevation $\theta$ and azimuth $\Phi$. Then, the elevation and azimuth servos 8 and 12 take the $\theta$ and $\Phi$ angular information from converter 5 and drive the elevation and azimuth axes of the gimbal system, not specifically shown, supporting radar antenna dish 10 into angular correspondence therewith, with the result that the dish center line will be directed parallel to the direction vector information produced by system 4. In this position, then, beam 14 will intercept the target and, with target acquisition, the normal radar tracking operation may proceed.

It will, of course, be apparent that the distance between the antenna and radar systems 3 and 10, respectively, should be relatively small compared to the range distance of target 1 in order to minimize the parallax problem, that is, the fact that paths 2 and 14 are parallel to each other. It will be appreciated that the parallax condition becomes appreciably more significant if target 1 is flying at a relatively low altitude, if the beamwidth of beam 14 is extremely narrow, or if the spacing between antenna 3 and dish 10 is excessive. Under certain combinations of these factors, as will be appreciated, acquisition becomes impossible, hence the necessity to maintain these factors within predetermined limits, as based on defined system requirements.

Referring now to FIGURE 2, there is shown in block diagrammatic form, antenna system 3 and a portion of direction cosine measuring system 4. The antenna system comprises two antenna pairs positioned along an $x$-baseline and two similar antenna pairs positioned along a $y$-baseline, the $x$- and $y$-baselines being mutually perpendicular. In particular, the first pair of $x$-baseline antennas 16 and 17 are positioned at $4.5\lambda$ wavelengths apart, $\lambda$ being the wavelength of the target-transmitted signal frequency, $f_c$. The remaining antenna pair comprises antennas 18 and 19, positioned $5\lambda$ wavelengths apart. The y-baseline antenna system includes a pair of antennas, 23 and 24, spaced 4.5λ wavelengths apart, and another antenna pair, 20 and 21, spaced at 5λ wavelengths apart. The x- and y-baselines, shown in dotted form, intersect each other midway between their respective 5λ antenna pairs.

The measuring system includes an x-baseline receiver, shown dotted at 37, a corresponding y-baseline receiver 46, respective x- and y-baseline servo readouts 40 and 48, and a double local oscillator 26.

In particular, double local oscillator 26 includes a fixed frequency oscillator 25, whose output signal, having a frequency value of $f_c - f_{if}$, appears on an output conductor 31. This signal is applied, within oscillator 26, to one input terminal of a mixer 28, whose output signal, $f_{1kc}$, in turn is passed through an amplifier 29 to another output conductor 44 and also to an automatic frequency control circuit 30. The output signal of circuit 30 is applied to the frequency control terminal of an oscillator 27, whose output signal, $f_c - f_{if} - f_{1kc}$, is applied to the other input terminal of mixer 28 and also appears on a final oscillator 26 output line 34.

The x-baseline receiver 37 includes a series of crystal mixers 32, 33, 35 and 36, associated with antennas 16, 17, 18, and 19, respectively. Each antenna is coupled to one input terminal of its associated crystal mixer. Output conductor 31 of oscillator 26 is connected to the other input terminal of each of mixers 32 and 35, while output conductor 34 is connected to the other input terminal of each of mixers 33 and 36.

The output signals of mixers 32 and 33 are applied to the two respective input terminals of an adder 38, whose output terminal, in turn, is connected to the input terminal of an AM detector 39. Similarly, the output signals from mixers 35 and 36 are applied to the two input terminals of an adder 42, whose output signal, in turn, is applied to the input terminal of another AM detector 43. Finally, the output signals from detectors 39 and 43, comprising the two output signals of the x-baseline receiver 37, are applied to x-baseline servo readout 40, shown in more detail in the following FIGURE 3.

Each of the y-baseline antennas, 20 through 24, respectively, are connected to a y-baseline receiver 46, which may be similar in all respects to x-baseline receiver 37. Accordingly, receiver 46 receives the oscillator 26 output signals appearing on conductors 31 and 34, and its two output signals are applied to a y-baseline servo readout 48. Finally, the $f_{1kc}$ signal appearing on output line 44 of oscillator 26 is applied to the other input terminal of readout 48.

In considering the operation of the FIGURE 2 circuitry, consider first the operation of double local oscillator 26. Oscillator 25 produces an output signal whose frequency is $f_{if}$ less than the target-transmitted signal, $f_c$ or $f_c - f_{if}$. Oscillator 27 is driven, in a manner to be shortly explained, at a frequency of 1 kc. less than the oscillator 25 frequency, or at $f_c - f_{if} - f_{1kc}$. Thus, the output signal frequency from mixer 28 will be at the 1-kc. difference frequency, which, in being passed back to the frequency control terminal of the variable frequency oscillator 27, through the automatic frequency control unit, acts to maintain the oscillator 27 output signal frequency exactly 1 kc. less than the frequency of the oscillator 25 signal. This 1-kc. signal from mixer 28 is amplified and passed to output conductor 44.

The output signal frequencies of mixers 32 and 35 will correspond to the difference of their applied signal frequencies, or $f_{if}$. In the same way, the output signal frequencies of mixers 35 and 36 will also be at the difference frequency between their respective applied signal frequencies, or $(f_{if} + f_{1kc})$.

Adder 38, which may be a simple linear mixer, produces an output signal whose frequency is the simple sum of $f_{if}$ and $(f_{if} + f_{1kc})$, and appears as an AM modulated signal having $f_{if}$ as its carrier frequency with an envelope corresponding to the $f_{1kc}$ signal. The significance of the phase of the $f_{1kc}$ envelope will be described shortly. In the same way, AM detector 39, which may, for example, be of a simple audio variety, serves to detect the envelope of its input signal, and hence will produce the 1-kc. signal on its output terminal.

In the manner just described, the adder 42 output signal will comprise a carrier signal of $f_{if}$ frequency amplitude modulated by the $f_{1kc}$ signal. The envelope, $f_{1kc}$, will then be detected by detector 43 to appear as a 1-kc. output signal having exact phase coincidence with the envelope.

Although the exact operation of the servo readout will be described in detail in connection with the following FIGURE 3, certain physical principles involved in the basic operation of the direction cosine measuring unit will now be set forth. Briefly, as described in detail in the earlier-noted application for patent, the path lengths taken by the $f_c$ signal from the target to each of antennas 16 and 17, taking this antenna pair as an example, will generally be different, as determined by the direction of the target relative to the antenna pair. This means, then, that the $f_c$ signal, as received at the two antennas, will exhibit a phase difference owing to the difference in the two path lengths. As was shown in the prior-noted application for patent, the relationship between this phase angle and the direction to the target may be expressed mathematically as:

$$\cos \theta = \frac{\Phi}{d}$$

where $\Phi$ is the phase difference between the two received signals, $d$ is the distance between the antenna pair, and cosine $\theta$ is the direction cosine to the target measured from the center point of the antenna pair. A single direction cosine value, measured from an antenna pair, actually locates the target to the extent that it dies along a conic section, each point on the section having the measured direction cosine value.

The phase difference between any antenna-pair-received signal must be converted into a form usable by the servo readout systems. This is accomplished, first of all, by exactly relating within double local oscillator 26, in the manner described earlier, the 1-kc. signal, $f_{1kc}$, appearing on output line 44 and the 1-kc. frequency difference in the output conductor 31 and 34 signals. In other words, the 1-kc. frequency difference between the conductor 31 and 34 signals corresponds precisely, both in phase and frequency, to the 1-kc. signal on line 44.

Now, it can be shown mathematically that the two output signals from mixers 32 and 33, taken by way of example, in being mixed with the 1-kc. offset signal frequencies from oscillator 26 and then added together, produce a 1-kc. envelope whose phase relationship with the originating $f_{1kc}$ signal on conductor 44 corresponds exactly to the phase difference between the $f_c$ signals appearing on antennas 16 and 17. Since the detector 39 signal is taken directly from the envelope of the adder signal, the phase relationship between the detector 39 signal and the line 44 signal will also correspond exactly to the phase difference between the signals received on antennas 16 and 17. Hence, the direction cosine information derived from the antenna pair has been effectively transferred from the phase difference between a very high frequency carrier signal to the phase difference between a pair of 1-kc. signals.

Assume now, that instead of a single antenna pair, two of such antenna pairs are employed, positioned such that their baselines intersect each other at their respective midpoints and are further directed at right angles to each other. With this configuration, two direction cosines would be measured, one by each antenna pair, and by appropriately combining the information obtained, the target can be determined to lie along a line formed by the intersection of the two conic surfaces, as defined by the two respective direction cosines. This means, therefore, that a single cross-baseline antenna pair is sufficient to determine the direction vector of the target relative to the mid-point between the antenna baselines.

Another characteristic which enters at this point is that of direction cosine ambiguities, which will result if the spacing between each antenna pair is more than ½ wavelength apart based on the frequency of the received signal. Although this particular point also is discussed in detail in the co-pending application for patent noted previously, it may be stated briefly that ambiguities arise since, under the conditions stated, the target position may be such that a complete cycle of phase difference may exist between the two received signals and, in the absence of additional information, the exact amount of phase difference, to an integral number of cycles, will not be determinable. Hence, for a measured phase shift, the target may be in any one of a number of discrete positions and hence its actual direction will be ambiguous.

This means, then, that unambiguous direction cosine information can be obtained only by employing two antennas spaced at λ/2 wavelengths apart, based on the transmitted signal frequency. With this spacing, it is impossible for the target position to be such that more than half a wavelength, or cycle, can exist in the two antenna-received signals. However, the direction cosine information so derived lacks sufficient accuracy for most applications, since, in general, the precision or accuracy to which the phase shift between a pair of signals can be measured, which, in turn, determines the accuracy of the direction cosine measurement, is substantially a constant portion of the particular wavelength. Hence, greater measurement accuracy requires smaller wavelength signals, etc.

Accordingly, to achieve more accuracy than is possible with a λ/2 wavelength antenna spacing, it is necessary to employ shorter wavelength signals, corresponding to greater antenna spacings, since larger antenna spacings will reflect relatively smaller target movements into greater phase shifts in its received signals. This latter type of antenna configuration will, however, as noted earlier, result in ambiguous direction cosine information. This means, then, that to achieve both high accuracy and avoid ambiguities it is necessary to utilize both types of information, highly-accurate and unambiguous, and use the unambiguous information to resolve the ambiguities in the accurate data so that overall system accuracy can be based on the ambiguous, but accurate data. In the present direction cosine measuring system, as will later be shown in the servo readout system detailed in FIGURE 3, the unambiguous phase information, corresponding to the λ/2 wavelength antenna spacing, is effectively obtained by subtracting the 4.5λ antenna information from the 5λ antenna information and deriving, therefore, completely unambiguous direction cosine data of the target position.

Figure 3:
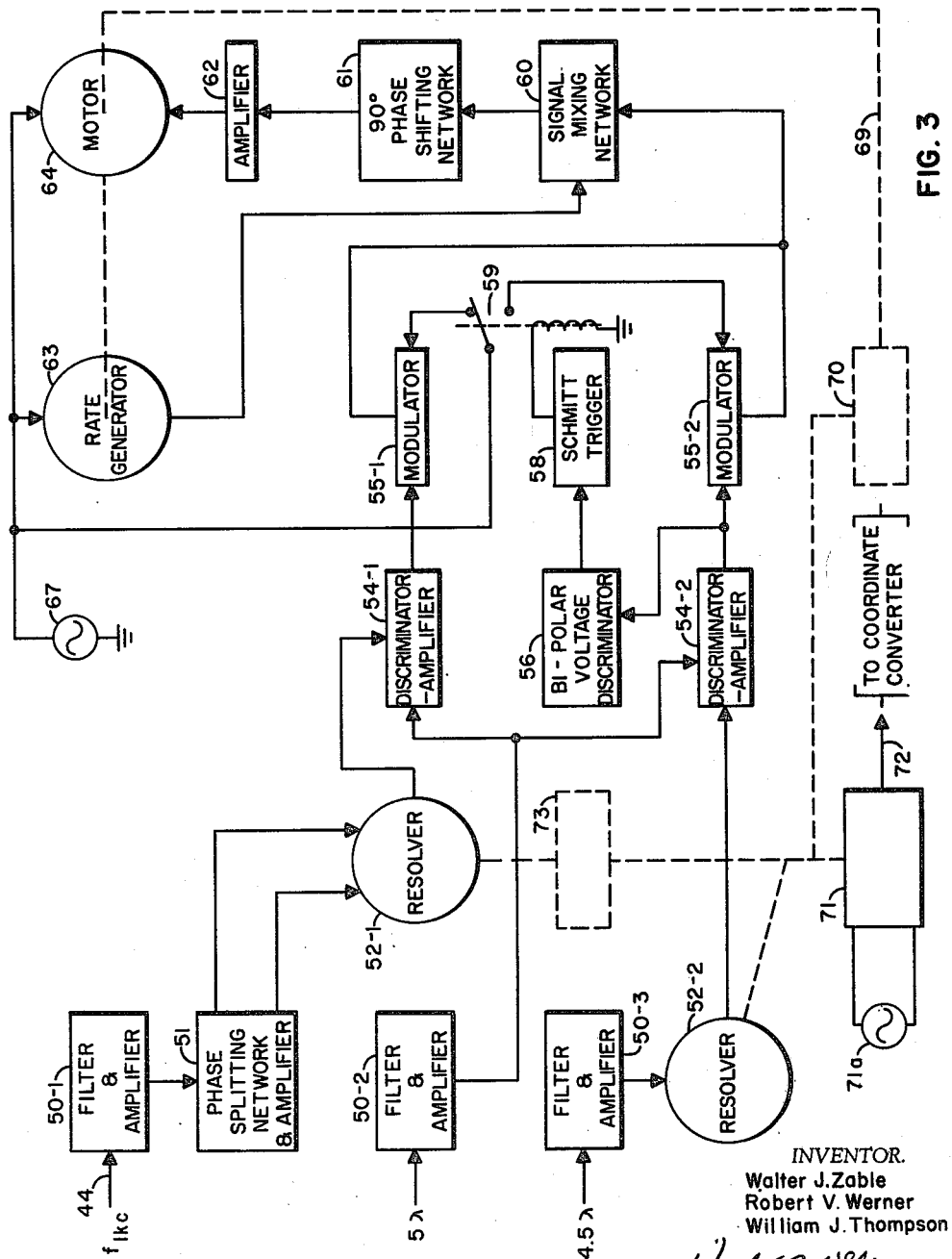
FIGURE 3 is in block diagrammatic form showing one of the antenna baseline servo readouts of FIGURE 2.

Referring now to FIGURE 3, there is shown a typical servo readout unit, such as the x-baseline readout 40 of FIGURE 2, shown in block diagrammatic form. The $f_{1kc}$ signal appearing an output conductor 44 of double local oscillator 26 is applied to a filter and amplifier circuit 50–1 and from there to a phase-splitting network and amplifier 51. The pair of output signals from the phase-splitting network 51 are applied across the two stator windings, not shown, of a resolver 52–1, shown schematically, whose output signal, taken from its rotor winding, not shown, is applied to one input terminal of a discriminator and amplifier circuit 54–1. The 5λ signal from receiver 37, coming from the output of detector 43 in FIGURE 2, is applied through a filter and amplifier circuit 50–2 to the other input terminal of discriminator and amplifier circuit 54–1 and to one input terminal of another discriminator and amplifier circuit 54–2. The 4.5λ signal coming from the output terminal of detector 39 in FIGURE 2 is applied through another filter and amplifier circuit 50–3 to another resolver 52–2. The output signal of resolver 52–2 is applied to the other input terminal of discriminator and amplifier circuit 54–2.

The output signals from discriminator 54–1 and 54–2 are applied to one input terminal of modulator circuits 55–1 and 55–2, respectively, whose output conductors are mutually connected to one input terminal of a signal mixing network 60. The output terminal of discriminator and amplifier 54–2 is also coupled to the input terminal of a bi-polar voltage discriminator circuit 56, whose output signal is applied to the input terminal of a Schmitt trigger circuit 58. The output terminal of Schmitt trigger 58 is coupled to the energizing coil of a relay, indicated at 59. The movable arm of relay 59 receives the output signal of an A.-C. signal source 67 having a signal frequency, for example, of 400 c.p.s. The two fixed switch points of relay 59 are connected to the other input terminals of modulators 55–1 and 55–2, respectively.

The output signal of signal mixing network 60 is shifted in phase by a 90° phase-shifting network 61, and is then amplified by an amplifier 62 for application to one stator winding, not shown, of a two-phase servo motor 64. The other stator winding of motor 64 is coupled to the output terminal of signal source 67, while the shaft 69, shown dotted, of motor 64, is connected to the shaft of a rate generator 65. The source 67 signal is applied to an input winding of generator 65 and its output signal is applied to the other input terminal of signal mixing network 60.

Finally, the output shaft 69 of motor 64 is coupled through a gear reduction box 70 to drive the shaft of resolver 52–2 and the movable arm, not here shown, of a potentiometer 71. The output signal of a constant amplitude A.-C. signal source 71a is applied to potentiometer 71, and the output signal from the potentiometer is taken on an output lead 72 for application to the coordinate converter. The resolver 52–2 shaft connection is reduced by another gear box 73, having, for example, a gear-down ratio of 10:1, and from there drives the shaft of resolver 52–1.

The basic function of the FIGURE 3 circuitry is to combine the 5λ and 4.5λ information to achieve effective unambiguous λ/2 information, employ this effective λ/2 information to correct ambiguities in the 5λ direction cosine information, and drive its servo motor shaft to a position corresponding to the direction cosine of the target vehicle measured from its respective baseline. In considering the detailed operation of the circuit, consider first the operation of the Fine channel, that is the portion of the circuitry dealing with the 5λ signal and the $f_{1kc}$ reference signal. Assume, first of all, that motor shaft 69 has been driven to null, that is, the position of the Fine channel resolver 52–1 shaft corresponds exactly to the direction cosine value of the target position. In this condition, resolver 52–1 will shift the phase of the $f_{1kc}$ signal an amount exactly 90° from the 5λ signal as it comes from the FIGURE 2 circuitry. Accordingly, discriminator 54–1 will, under the conditions stated, produce a zero-valued output signal, with the result that no A.-C. signal from source 67 will be passed by modulator 55–1 to the input of the motor circuitry, beginning with signal mixing network 60.

Assume now that the target direction vector changes and the assumed null condition no longer exists. Under this circumstance, the phase-shift imparted to the $f_{1kc}$ signal by resolver 52–1 will no longer correspond to the 90° 5λ signal phase offset, with the result that discriminator 54–1 will produce an output D.-C. signal of one or the other polarity, as determined by the off-null direction of the resolver 52–1 shaft. This D.-C. signal will cause the source 67 signal to be passed to network 60 by modulator 55–1, either in phase or exactly 180° out of phase, as determined by its polarity. This passed signal, in turn, after phase shifting by network 61 and amplification by amplifier 62, will energize motor 64 such that its shaft will rotate in a direction corresponding to its phase. The motor shaft will continue to rotate until null is again reached. As will be appreciated, rate generator 65 feeds a degenerative signal, during the time of rotation, to the input of signal mixing network 60 for stabilization purposes.

Consider now the operation of the readout circuitry in response to effective λ/2 wavelength error signal information. If the shaft displacement of motor 64 is off of null, the phase shift afforded the 4.5λ signal by the resolver 52–2 shaft position will not correspond to the 5λ signal, with the result that an output error signal will be produced by discriminator and amplifier 54–2. Now, if this error signal, of either polarity, attains a predetermined magnitude, as determined by the adjustment of bi-polar voltage discriminator 56, in the manner described in the earlier-noted application for patent, the bi-polar discriminator will produce an output signal whose level is sufficient to trigger Schmitt trigger 58 to its "on" conduction state. The operation of trigger 58 will cause the relay coil of relay 59 to be energized, with the result that its movable switch arm will contact the lower fixed switch point and thereby couple the source 67 signal to the corresponding input terminal of modulator 55–2, instead of its normal coupling to modulator 55–1.

With this modulator connection made, signal mixing network 60 and the remaining motor drive circuitry will be energized by the source 67 signal, based on the degree of error signal produced by discriminator 54–2 in the Coarse channel. The motor 64 shaft will consequently be rotated until the shaft of resolver 52–2, after gear-down through gear box 70, is such as to introduce a shift in the 4.5λ signal substantially corresponding to the 90° point from the 5λ signal phase shift. When this point is reached, the error signal from discriminator 54–2 will drop below a predetermined positive or negative value, with the result that bi-polar voltage discriminator 56 will produce a correspondingly decreased output signal and Schmitt trigger 58 will trigger back to its "off" conduction state. When this happens, relay 59 will be de-energized and modulator 55–1 will again be connected to the source 67 signal. Hence, the Fine channel will regain control and motor 64 will then be driven to a highly-accurate null position based on the phase difference between the 5λ and the reference $f_{1kc}$ signals.

The Coarse channel, by comparing the 4.5λ and 5λ signals in discriminator 54–2, effectively subtracts one from the other, and hence controls motor 64 based on the difference in their wavelengths, or λ/2. This Coarse channel will regain control whenever a predetermined error signal exists on the output terminal of discriminator 54–2, and hence ambiguities in the Fine channel information will always be resolved. Gear box 73, as noted earlier, furnishes a 10:1 step-down ratio to thereby correspond to the ratio between the λ/2 and 5λ, respective Coarse and Fine, wavelength information.

In summary, then, the energization of motor 64 is controlled by the Coarse channel only when its resolver shaft position reflects a gross error in the motor shaft position, as determined by the magnitude of the discriminator 54–2 output signal. During all other times, its position is controlled to high accuracy by the Fine channel, hence the previous statement that the Coarse channel serves to resolve any ambiguities that may be present in the mutliple-wavelength 5λ Fine channel information.

Figure 4:
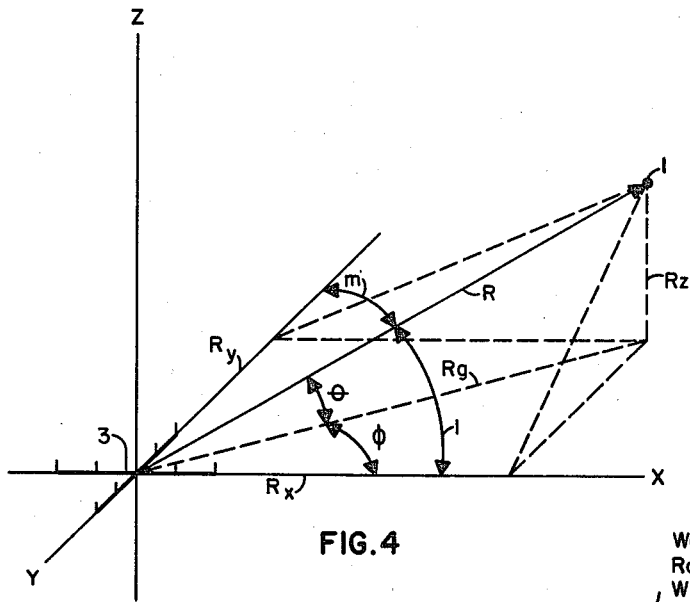
FIGURE 4 is a geometric representation for illustrating the mathematical functions performed by the coordinate converter.

In FIGURE 4 is shown the geometrical relationships between the direction cosine information produced by direction cosine measuring unit 4 of FIGURE 1 and the radar elevation servo and azimuth servo information requirements. Assume the target 1 to be at a slant range R, at a direction cosine value $l$, measured from the $x$-baseline of antenna system 3, and at a direction cosine value $m$ measured from the $y$-baseline of antenna system 3. Since the radar dish and the antenna system are assumed in close proximity to each other for avoiding parallax difficulties in the radar target acquisition, the radar dish and antenna system are assumed at the same point, which is at the origin of an $x$, $y$ and $z$ coordinate system. The $x$- and $y$-axes of the coordinate system extend from the origin along the $x$- and $y$-antenna baselines, respectively, of the antenna system. The projection of the target slant range R along the $x$–$y$ plane is designated $R_g$. The radar input information requires an elevation angle $\theta$, measured between R and $R_g$, and an azimuth angle $\Phi$, measured between the $x$-axis and $R_g$. Finally, the projection of $R_g$ along the $x$-axis is denoted by $R_x$, and its similar projection along the $y$-axis by $R_y$.

It will be observed by inspection that $$l = \frac{R_x}{R} \quad (1)$$

In the same way, $$R_x = R_g \cos \Phi \quad (2)$$

$$R_g = R \cos \theta \quad (3)$$

Substituting the value of $R_g$ from Equation 3 into the equation for $R_x$ in Equation 2;

$$R_x = R \cos \theta \cos \Phi \quad (4)$$

Substituting 4 into 1 and cancelling out the R's;

$$l = \cos \theta \cos \Phi \quad (5)$$

In the same way:

$$m = \frac{R_y}{R} \quad (6)$$

$$R_y = R_g \sin \Phi \quad (7)$$

$$R_g = R \cos \theta \quad (8)$$

Hence:

$$R_y = R \cos \theta \sin \Phi \quad (9)$$

and $$m = \cos \theta \sin \Phi \quad (10)$$

The $x$-baseline servo readout 40 in FIGURE 2 of direction cosine measuring system 4 will produce a shaft angle whose direction cosine value is $l$. In the same way, $y$-baseline servo readout 48 will provide a shaft position whose direction cosine value is $m$. With these two input values, coordinate converter 5 in FIGURE 1 must compute the radar coordinate system angles of $\theta$ and $\Phi$ in order that the respective elevation and azimuth servos associated with the respective radar dish axes may direct them such that the radar beam direction parallels the direction vector path from the target to antenna system 3, as measured by system 4.

In FIGURE 5 is shown the coordinate converter system according to the present invention, shown earlier as a block diagram 5 in FIGURE 1. Again shown, but here in detail, is potentiometer 71, from FIGURE 3, which includes a resistor element 74 whose two ends are respectively connected across signal source 71a. The center point of resistor element 74 is grounded and output lead 72, connected to the movable arm of the potentiometer, is driven by the servo motor shaft 69, from FIGURE 3, whose rotational position represents the direction cosine $l$ value. Conductor 72 is coupled to the input terminal of a resolver driver 78 whose output signal, in turn, is applied across a stator winding 79 within a resolver 80.

The $y$-baseline servo readout unit, shown as block 48 in FIGURE 2, includes an output potentiometer 75, as shown here in FIGURE 5, similar in all respects to the $x$-baseline potentiometer 71. The movable arm of potentiometer 75 is conductively coupled to an output conductor 76 and is driven by the $y$-baseline servo readout to a displacement corresponding to direction cosine $m$. Conductor 76 is coupled to a resolver driver 82, whose output signal, in turn, is applied across the other resolver stator winding 83 of resolver 80.

The signal appearing across one rotor winding 85 of resolver 80 is applied to the input terminal of a $\Phi$ servo system 88, in turn driving an output shaft 89, shown dotted, which is coupled to the resolver 80 rotor, as indicated schematically. The signal appearing across the other rotor winding 86 is applied as a feedback signal to the Φ servo system 88 as well as to another resolver, to be described shortly. Output shaft 89 of servo system 88 also drives a synchro transmitter 90, indicated schematically. Output shaft 89 also drives the shaft of another synchro transmitter 92, after being geared up by a 1:10 gear-step-up box 91, shown dotted. The output signal produced by an A.-C. signal source 94 is applied to each of synchro transmitters 90 and 92, and the three output conductors from each transmitter, in turn furnishing displacement information of their respective synchro shaft positions, are indicated going to the azimuth servo system shown in the following FIGURE 6.

One output terminal of source 71a is also connected to the input terminal of a resolver driver 96, whose output signal is applied across one stator winding of another resolver 97. One rotor winding, 98, of this resolver is connected across the two ends of a resistor 99, one end of resistor 99, in turn being coupled to the ungrounded end of a rotor winding 86 in resolver 80. The other end of resistor 99 is coupled to the input terminal of a θ servo system 102, driving an output shaft 103 connected to the resolver 97 rotor. The other rotor winding 100 of resolver 97 furnishes a feedback signal for stability purposes to the θ servo system 102. Output shaft 103 is additionally coupled to another synchro transmitter 104, also receiving the source 94 output signal. In addition, shaft 103 is coupled through another 1:10 gear-up box 105 to drive the shaft of another synchro transmitter 106, also connected to the source 94 output terminals. The three output leads from each of synchro transmitters 104 and 106 are indicated as going to the elevation servo system, later shown in FIGURE 6.

In considering the operation of the FIGURE 5 coordinate converter, assume, for the purpose of subsequent discussion, that the magnitude of the source 71a output signal corresponds to the range, R, from FIGURE 4, of the target position. Now, this assumption will result actually in a fictitious constant range, since the true range is not determinable by the present direction cosine measuring system. As will be seen, this fictitious range dimension will cancel out in later computations, since only direction vector output information is needed for the basic radar acquisition problem. The potential picked off on lead 72, corresponding to the direction cosine $l$ magnitude, will represent $R_x$, the projection of R along the x-axis. In the same way, the voltage appearing on conductor 76 from potentiometer 75, whose shaft position corresponds to direction cosine $m$, will represent $R_y$, the projection of R along the y-axis, in FIGURE 4. Resolver drivers 78 and 82 serve to linearly amplify the respective $R_y$ and $R_x$ voltages in order to meet the input signal requirements of resolver 80. These voltages, representing $R_x$ and $R_y$, are applied as before noted across windings 79 and 83, and the rotor winding 85, at a shaft position Φ, will pick off a signal whose value represents:

$$e_\Phi = R_x \sin \Phi + R_y \cos \Phi$$

The Φ servo 88 is arranged in accordance with well-known servo techniques to drive its output shaft 89 to a position such that its input signal $e_\Phi$ is of zero magnitude. When this condition is attained, then $$R_x \sin \Phi = R_y \cos \Phi$$

or $$\Phi = \tan^{-1} \frac{R_y}{R_x}$$

Accordingly, the shaft 89 position will represent the azimuth angle Φ at servo null. This shaft position will be transmitted, through the output leads of synchro transmitters 90 and 92 to a corresponding synchro transformer in the radar azimuth servo, as shown in FIGURE 6 and explained in connection therewith. Gear box 91, in providing the step-up drive from synchro transmitter 90 to transmitter 92, serves in the well-known manner to permit more accurate shaft positioning in the synchro receiver than can be obtained by a single synchro transmitter and receiver combination.

With shaft 89 at null position, the signal picked off of the other resolver rotor winding 86 will be:

$$R_x \cos \Phi + R_y \sin \Phi = e$$

This signal, as may be shown mathematically, also represents $R_g$, the projection of the range R on the ground or x—y plane.

The $R_g$ signal will also represent the derivative of the signal picked off of the winding 85, as may be seen by differentiating the above equation. Hence, this signal is applied as a derivative feedback signal to Φ servo system 88 for stability purposes, as is customary in servo practice.

The $R_g$ signal is also, as noted earlier, applied across rotor winding 98 of resolver 97, and since, as noted earlier, this signal represents the fictitious range R, the condition obtained when θ servo system 102 drives its output shaft 103 to a null or zero signal pick-off position, the angle θ has been solved for, since $$\theta = \cos^{-1} \frac{R_g}{R}$$

The position of shaft 103 is transmitted to the θ servo system loop associated with the radar dish in FIGURE 6, whose synchro transmitters 104 and 106 are connected, as previously described, by a gear-box 105 for the purposes of achieving high accuracy positioning in the radar elevation servo system.

Referring now to FIGURE 6, there is shown in block diagrammatic form, elevation and azimuth servos 8 and 12, respectively. In particular, the three output conductors of synchro transmitter 90, in FIGURE 5, are connected to the three respective input terminals of a synchro control transformer 110, within servo 12. In the same way, the three output terminals of synchro transmitter 92, in FIGURE 5, are connected to three corresponding input terminals of another synchro control transformer 114 within servo 12. The output signals from transformers 110 and 114 are applied to the two respective input terminals of a switching network 112.

Network 112, includes a pair of back-to-back connected diodes, indicated at 115, which are series connected with a resistor 116, in turn positioned between the transformer 110 output conductor and ground. Finally, the transformer 114 output conductor and the output conductor of network 112 are mutually connected to the common junction of resistor 116 and diodes 115. The output signal from network 112 is amplified by an amplifier 118 for application to a motor 119, whose shaft 120 drives both the azimuth axis of the radar system dish 10 to the azimuth angle Φ and, in addition, drives the rotor, not specifically illustrated, of synchro control transformer 114. Further, shaft 120 is coupled through a gear-reduction box 121, having the same gear ratio, 1:10, as gear box 91 in FIGURE 5, to drive the rotor of transformer 110.

Elevation servo 8 receives the three output signals produced by synchro transmitter 104, in FIGURE 5, on a synchro control transformer 122 and similarly receives the three signals produced by synchro transmitter 106, in FIGURE 5, on the three respective input conductors of another synchro control transformer 123. The output signals produced by the transformers 122 and 123 are applied to a switching network 125, which may be similar in all respects to network 112 shown detailed in azimuth servo 12. The output signal from network 125 is amplified by an amplifier 126 to drive a motor 128, whose shaft, in turn, drives dish 10 about its elevation axis and, additionally, drives the rotor of transformer 123. Finally shaft 130 drives the rotor of transformer 122 through a gear box 132 having the same gear ratio, 1:10, as did gear box 105 in FIGURE 5.

The function of drive unit 12, within FIGURE 6, is to energize motor 119 such that the angular position of its shaft 120 corresponds precisely to the shaft position of resolver 80 in FIGURE 5, whose position, in turn, represents the azimuth angle Φ. In the same way, motor 128 is energized such that the position of its shaft 130 corresponds exactly to elevation angle θ, represented by the resolver shaft 103 position as in FIGURE 5.

Considering first of all the operation of azimuth servo 12, assume, for example, that motor shaft 120 of motor 119 is at null, that is, its angular position corresponds exactly to shaft 89 in FIGURE 5. Under this condition, the output signals from synchro transformers 110 and 114 will each be of zero magnitude, and motor 119 will receive no energizing signal. Upon subsequent movement of shaft 89, synchro transmitter 92, owing to the gear-up relationship afforded it by gear box 91, will transmit a considerably larger error signal to its corresponding transformer 114 than will transmitter 90 to its respective transformer 110.

Accordingly, motor 119 will be energized, through amplifier 118, by the error signal produced by transformer 114. Accordingly, motor 119 will be energized in one direction or the other, as determined by the phase of the transformer 114 error signal, and shaft 120 will be driven in a proper direction until null, that is, the zero signal output condition of transformer 114, is again obtained.

Now, owing to the gear-up relationship between the synchro repeater pairs, it is possible that the position of shaft 120, under certain conditions of signal dropout, high shaft accelerations, etc., may lag or lead the shaft of its corresponding transmitter 92 by one or more integral numbers of turns. Under this condition, with as a consequence no output error signal being developed by transformer 114, synchro transformer 110 will produce an error signal and will be passed, through zener breakdown of diodes 115, to amplifier 118. Motor 119 would consequently be energized by this transformer 110 error signal until it was no longer sufficient in magnitude to pass diodes 115, at which time the error signal from transformer 114 will take over and furnish a "fine" error signal to amplifier 118 until shaft 120 attains null again.

Accordingly, it is seen that the azimuth angle Φ, originating as the position of shaft 89 in FIGURE 5, is transferred precisely to motor shaft 120 and from there to the azimuth axis of the dish 10 gimbal system. The operation of elevation servo 8 in FIGURE 6 is identical to that described for servo 12 in that the shaft 103 angular position, representing the elevation angle θ, will be transferred precisely to motor shaft 120 and from there to the elevation axis of the gimbal system supporting dish 10.

In summary, it is seen that the elevation and azimuth angles of dish 10 will be driven such that the line of sight 14 of the radar dish, in FIGURE 1, points in exact parallel to the direction vector determined by the crossed-baseline antenna system, direction cosine measuring system, etc., to target 1. If the system thus described is employed for initial radar acquisition, it will be apparent that once acquisition has been obtained normal radar tracking may commence, or, in the event that an optical telescope is employed rather than radar dish 10, taken by way of example, then not only can the initial acquisition function be fulfilled by the direction cosine measuring system, but continuous servoing can thereafter be employed so that target 1 will always remain in the field of the telescope's view, hence eliminating the usual requirement of having to manually servo the telescope axis to maintain the target in the optical field of view.

Figure 7:
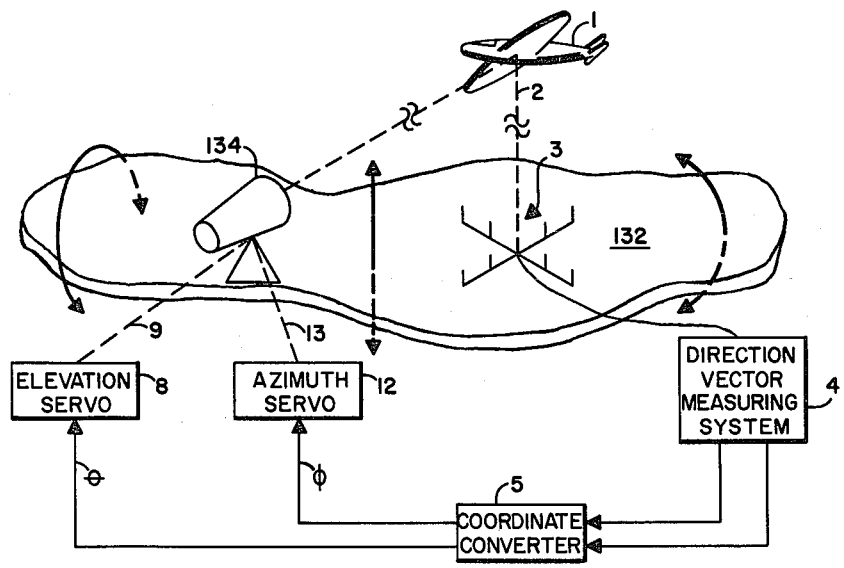
FIGURE 7 is a partly schematic and partly block diagrammatic representation of another embodiment of the present invention.

In FIGURE 7 is illustrated another embodiment of the present invention wherein continuous tracking information of a moving target, as produced by a direction vector measuring system, is employed to maintain the line-of-sight of an optical tracking system positioned on a moving platform, such as a ship, on the target. In the figure, the ship's deck, as generally shown at 132, is assumed to have motion, as indicated by the three arrows shown left to right, representing roll, heave and pitch. The antenna system 3, affixed to the ship, is connected, as previously, to a direction vector measuring system 4, whose output signals, $l$ and $m$, are fed into coordinate converter 5. Coordinate converter 5, as in the previous FIGURE 1, produces an elevation signal θ and an azimuth signal Φ, in turn applied to elevation and azimuth servos 8 and 12, respectively. Shafts 9 and 13 from servos 8 and 12, respectively, drive a gimbal-mounted optical tracker, shown schematically at 134, similar to the radar dish mounting as described previously in connection with FIGURE 1.

The operation of the FIGURE 7 embodiment is readily apparent from the operation previously given for the FIGURE 1 embodiment and related figures. As the ship's deck experiences various movements of roll, pitch and heave, in turn caused primarily by wave action, the direction vector information produced by system 4, in terms of $l$ and $m$, will correspondingly vary, and path 2, based on these two values, will continue to be directed at target 1. Then, coordinate converter 5, in continuously converting $l$ and $m$ into Φ and θ, will enable the corresponding elevation and azimuth servos to drive the axis of optical telescope 134 to correspond to the target direction. Hence, the line of sight of the optical tracker 134 will remain pointed at target 1 regardless of both the target 1 and deck 132 movements.

Figure 8:
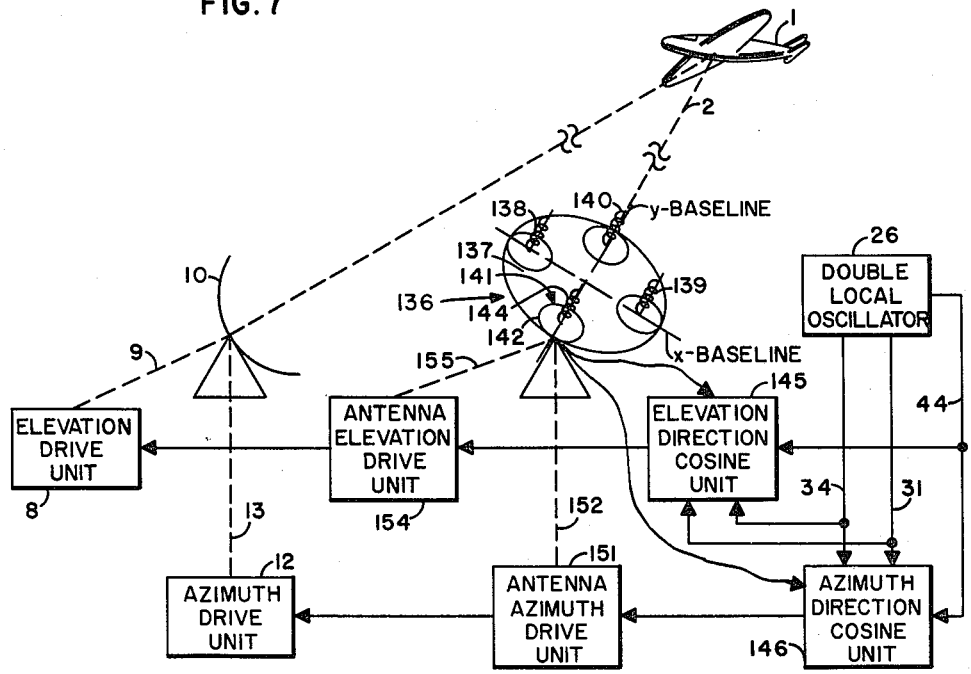
FIGURE 8 is a partly schematic and partly block diagrammatic representation of still another embodiment according to the present invention.

In FIGURE 8 is shown another embodiment of the present invention in which the coordnate converter 5, as previously required in FIGURES 1 and 7, is eliminated. In this embodiment, the antenna system is indicated generally at 136 and includes, in schematic form, a platform 137 supported from a base by a gimbal arrangement, again not specifically illustrated. Arranged on pedestal or platform 137 are four helical antennas, including one antenna pair 138 and 139, mounted along an $x$-baseline, and a second antenna pair, 140 and 141 mounted along a $y$-baseline, the $x$- and $y$-baselines being, as previously, directed at right angles to each other and intersecting each other at their respective midpoints. Helical antenna 141, taken by way of example, includes a spiral or helical conductor element 144 wound around a central supporting element, the two, in turn, being mounted in the center of a circular ground screen 142. Screen 142 is supported on platform 137 along the $y$-baseline, as previously mentioned.

The pair of $x$-baseline antennas are indicated generally as being conductively coupled to an elevation direction cosine unit 145, and the $y$-baseline helical antennas to a corresponding azimuth direction cosine unit 146. Double local oscillator 26, as found in FIGURE 2, has its output conductors 31, 34 and 44 connected to each of the direction cosine units 145 and 146.

The output signal of azimuth unit 146 is applied to an antenna azimuth drive unit 151 having a shaft 152 coupled to the azimuth axis of the gimbal system supporting platform 137. An output signal is also fed from drive unit 151 to a radar dish azimuth drive unit 12, whose output shaft 13 again is shown schematically coupled to radar dish 10.

In the same way, the output signal of elevation direction cosine unit 145 is applied to an antenna elevation drive unit 154, in turn driving a shaft 155 coupled to the elevation axis of the platform 137 gimbal system. An output signal from drive unit 154 is applied to elevation drive unit 8, whose shaft 9 is coupled to the elevation axis of the gimbal system supporting dish 10.

Figure 9:
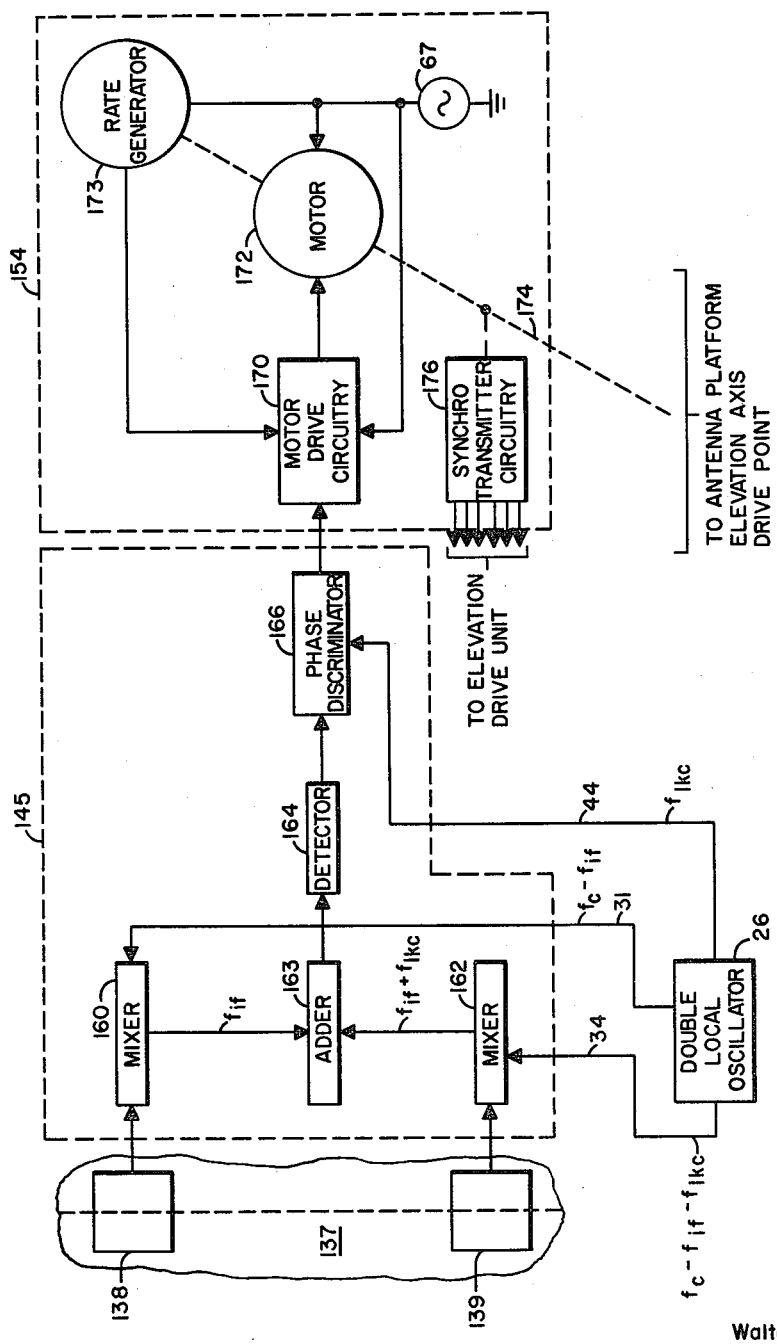
FIGURE 9 shows, in block diagrammatic form, the elevation direction cosine unit and antenna elevation drive unit of the FIGURE 8 embodiment.

Although the detailed operation of the FIGURE 8 system will become more clear after the description of FIGURE 9 and its operation, it may be stated briefly at this point that the gimbal system of platform 137 is driven in azimuth and elevation by the respective servo units 151 and 154, such that platform 137 is directed exactly normal to the target. Then, by merely transferring the platform azimuth and elevation axes shaft positions to the corresponding axes supporting dish 10, dish 10 will also be directed at the target, hence fulfilling the requirement for initial acquisition and/or continuous tracking. This basic, but different technique, it will be appreciated, eliminates the requirement for a coordinate converter such as found in FIGURE 1.

Before continuing with the description of operation of FIGURE 8, reference is made to FIGURE 9, which shows elevation direction cosine unit 145 and antenna elevation drive unit 154, taken as a representative example, of both axis drive systems. In particular, the output leads from helical antennas 138 and 139 are applied to one input terminal of each of a pair of mixers 160 and 162, respectively, while the signals appearing on the output conductors 31 and 34 of double local oscillator 26 are coupled to the other input terminals of mixers 160 and 162, respectively. The output signals from mixers 160 and 162 are applied to the two input terminals of an adder 163, whose output signal, in turn, is taken through a detector 164 to one input terminal of a phase discriminator 166. The remaining $f_{1kc}$ output signal of oscillator 26, appearing on output conductor 44, is applied to the other input terminal of phase discriminator 166.

The output signal of discriminator 166, constituting the output signal from the elevation direction cosine unit 146, is applied to the input terminal of a motor drive circuit 170 within antenna elevation drive unit 154. Drive circuit 170 may be similar to the combination of network 60, phase shift network 61 and amplifier 62, all shown earlier in FIGURE 3. The output signals from motor drive circuit 170 are applied to servo motor 172, also receiving the output signal from the A.-C. signal source 67. The output shaft 174 of motor 172 is coupled to a rate generator 173, which also receives the source 67 signal and delivers a feedback signal, again for stability purposes, to the motor drive circuitry.

Shaft 174 of the motor is connected, as indicated in the figure, to the elevation axis of the antenna platform and serves thereby to drive the platform in elevation. Shaft 174 also is applied to a synchro transmitter circuit, indicated in block 176, which produces two groups of three output signals each, the two groups, in turn, going to elevation drive unit 8 in FIGURE 8. This transmitter circuitry 176 is similar to the connections shown on FIGURE 5 for synchro transmitter 104, shaft 103, gear box 105 and synchro transmitter 106, which, in the manner previously described, furnish shaft positioning information to the elevation servo.

In considering the operation of the FIGURE 9 circuitry, assume that platform 137 has been driven to a null position in elevation such that the line of sight from the target is normal to the $x$-baseline. Under this condition, the target transmitted signal $f_c$ will undergo exactly equal path lengths to helical antennas 138 and 139, with the result that no phase difference will exist between the received signals at the antennas. Under this condition, as well be recalled from the previously given description of operation in FIGURE 2 circuitry, the signal from detector 164 will be exactly offset by 90° from the phase of the reference $f_{1kc}$ signal on conductor 44 from oscillator 26. Hence, a zero valued output signal will be passed by phase discriminator 166 to the motor drive circuitry 170 within the antenna elevation drive unit 154, and motor 172 will receive no energizing signal.

If now, the target position should move away from the assumed antenna elevation null position, a phase difference will appear between the received signals on antennas 138 and 139 and the detector 164 output signal will no longer be offset 90° in phase from the $f_{1kc}$ signal from oscillator 26. Under this condition, phase discriminator 166 will produce an output signal whose magnitude and polarity are determined by the magnitude and direction, respectively, of the new target position away from the previously assumed elevation angle null condition. Motor 172 will then receive a proper energizing signal from circuitry 170 such that its shaft 174 will be driven to direct platform 137 about its elevation axis until the previously described null condition is again attained.

Synchro transmitter circuitry 176 within drive unit 154 will transmit the platform elevation angle position to the elevation drive unit 8, which may, as described previously, be identical to that shown earlier in FIGURE 6, with the result that the elevation axis of disc 10 will be driven to correspond thereto and hence point at the target in elevation.

Azimuth direction cosine unit 146 will be similar in all respects to the elevation direction unit shown in detail in FIGURE 9 and just described, and the signals received by the other helical antennas 140 and 141 will result in the azimuth axis of the platform being driven to an angular position such that equal target signal phases appear on the two antennas. This elevation axis position is likewise transmitted to the elevation axis of dish 10 through azimuth drive unit 12 and its output shaft 13, in the manner just described for the elevation system.

It will be observed that only a single antenna pair is employed on platform 137 along each of the $x$ and $y$ baselines, and the system in this respect, differs from the earlier two embodiments where each baseline included two antenna pairs with resulting ambiguous Fine and unambiguous Coarse channel servo readout information. The same antenna format is not employed on platform 137 since the platform size resulting from the employment of $50\lambda$ antenna spacing would require excessively large servo drive units. At the same time, the employment of a $\lambda/2$ spaced antenna pair for each baseline, although of acceptable dimensions and yielding unambiguous direction cosine information, is also not feasible, owing to the electrostatic and interference effects existing between an antenna pair spaced at such a relatively short distance. Accordingly, the antennas shown in FIGURE 8 are assumed to be at not less than $1\frac{1}{2}\lambda$ apart, the minimum feasible distance for avoiding interference difficulties, and with this arrangement target location considered from the omnidirectional standpoint will be ambiguous in that any direction cosine value could actually relate to three target positions.

For this reason, the primary use of the FIGURE 8 circuitry will be for those cases where the approximate target position is initially known, at which time, assuming platform 137 to be pointed in substantially the proper direction, unambiguous acquisition can be achieved and dish 10 pointed properly at the target. It will be appreciated that numerous practical cases exist where the approximate initial position of the target is known, i.e., take off, landing, launching, etc., at least to the point of avoiding the ambiguity difficulties, and yet where the precise degree of initial location is insufficiently known to actually point a narrow beamwidth tracking system to the required accuracy. In such situations, the FIGURES 8 and 9 embodiments possess full utility.

It will be appreciated, of course, by those skilled in the art, that the foregoing disclosure relates only to a detailed preferred embodiment whose spirit and scope of the invention is set forth in the appended claims.

What is claimed is:

1. An electronic system for driving the servo section of a narrow beam-width tracker such that the tracker points toward a target vehicle, said target vehicle transmitting a continuous signal, said system comprising: first and second means responsive to the target vehicle transmitted signal for producing first and second output signals, respectively, representing first and second direction cosine information, respectively, of the position of said target; means for combining the first and second direction cosine signals produced by said first and second means, respectively, to produce signal information corresponding to the direction vector of the position of said target vehicle relative to said first and second means; and means for applying the direction vector signal information produced by the last-named means to the servo section of said narrow beamwidth tracker whereby said tracker is driven to point at said target vehicle.

2. The system according to claim 1 wherein said first and second means include at least first and second pairs of antennas, respectively, the phase difference of the target vehicle transmitted signal existing between the antennas of each of said first and second pairs of antennas corresponding to the direction cosines of the target position relative to said first and second pairs of antennas, respectively, and conversion means for converting the phase difference between the received signals at said first and second antenna pairs into said first and second output signals, respectively.

3. An electronic system responsive to a signal transmitted by a target vehicle for applying driving signals to the azimuth and elevation servos driving a narrow beamwidth tracking system, said electronic system comprising: first, second, third and fourth antennas, each of said antennas receiving the signal transmitted by said target vehicle, the line formed by said first and second antennas intersecting the line formed by said third and fourth antennas at right angles thereto; signal phase responsive means responsive to the phase difference in the target transmitted signal received on said first and second and on said third and fourth antennas for producing first and second direction cosine signal information of the position of said target vehicle relative to the lines formed by said first and second and said third and fourth antennas, respectively; conversion means for converting said first and second direction cosine signal information produced by said signal responsive means to azimuth and elevation signal information corresponding to the position of said target vehicle; and transmitting means for applying the azimuth and elevation axes signal information produced by said conversion means to the azimuth and elevation servos driving said narrow beamwidth tracking system to correspond thereto, whereby said tracking system is directed to point at said target vehicle.

4. The electronic system according to claim 3 wherein said signal phase responsive means includes signal generating means for producing first, second and third signals, the frequencies and phases of said first and second signals differing an amount corresponding exactly to the frequency and phase of said third signal, mixing means for mixing said first signal with the target received signal on said first and third antennas and said second signal with the signal received on said second and fourth antennas, whereby difference signals frequencies are formed by said mixing means at each of said antennas; first and second adder means for linearly adding the difference signals produced by said mixing means from said first and second antennas and from said third and fourth antennas, respectively, and first and second detector means for detecting the output signals produced by said first and second adder means, respectively, the phase difference between the signals produced by said first and second detector means and the third signal produced by said signal generating means corresponding to said first and second direction cosines, respectively.

5. The electronic system according to claim 4 wherein said signal phase responsive means includes, in addition, means for producing a constant amplitude periodically varying signal, first means for modifying the amplitude of the signal produced by the last-named means to correspond to the phase difference between the output signal produced by said first detector means and said third signal; and second means for modifying the amplitude of the signal produced by said last-named means to correspond to the phase difference between the output signal produced by said second detector means and said third signal, whereby said first and second direction cosine values appear as the modified amplitudes of the signals produced by said first and second means, respectively.

6. The electronic system according to claim 5 wherein said conversion means includes first and second rotatable shafts, means responsive to the modified amplitudes of the signals produced by said first and second means for rotating said first shaft such that its position corresponds to the azimuth direction of said target vehicle, and means responsive to the position of said first shaft and the constant amplitude periodically varying signal produced by said last-named means for rotating said second shaft such that its position corresponds to the elevation direction of said target vehicle.

7. The electronic system according to claim 6 wherein said conversion means includes, in addition, first and second synchro transmitter means coupled to said first and second rotatable shafts, respectively, said first and second synchro transmitter means producing output signals corresponding to the position of said first and second shafts respectively.

8. The electronic system according to claim 7 wherein said transmitting means includes first and second positionable synchro transformer means, means for coupling said first and second synchro transformer means to the azimuth and elevation servos driving said narrow beamwidth tracking system, respectively, whereby the narrow beam tracking system is driven by said azimuth and elevation servos to correspond in azimuth and elevation to the position of said first and second positionable synchro transformer means, respectively, and means for applying the signals produced by said first and second synchro transmitter means to said first and second synchro transformer means, respectively, whereby said first and second positionable synchro transformer means are positioned in accordance therewith and said narrow beamwidth antenna system is driven by said azimuth and elevation servos to point at said target vehicle.

9. An electronic system responsive to a signal transmitted by a target vehicle for determining the vector direction to the target whereby the azimuth and elevation servos driving a narrow beamwidth tracking system may be driven such that the tracking system points at said target vehicle, said electronic system comprising: an antenna system including first and second pairs of antennas, each antenna of each pair receiving the signal transmitted by said target vehicle; first and second direction cosine determining means coupled to said first and second antenna pairs, respectively, and responsive to the phase difference between the signals received on said first and second antenna pairs, respectively, for producing first and second direction cosine signal information, respectively, of the position of said target vehicle; means responsive to the first and second direction cosine signal information for producing corresponding azimuth and elevation signal information of said target vehicle position; and means for applying the azimuth and elevation signal information produced by the last-named means to the azimuth and elevation servo driving said narrow beamwidth tracking system, whereby said tracking system is driven to a point at said target vehicle.

10. In combination: signal radiating means; a movable platform; a plurality of antennas mounted on said platform, each of said plurality of antennas receiving the signal produced by said signal radiating means; means responsive to the phases of the signals received by said plurality of antennas for driving said platform to a position where the signals received by said plurality of antennas exhibit no phase difference relative to each other whereby said platform is positioned normal to said signal radiating means; a narrow beam tracking system located in proximity to said platform; and means for driving said tracking system in parallel to said platform whereby said tracking system is directed to point to said signal radiating means.

11. A tracking system for driving a narrow beamwidth tracker about its azimuth and elevation axes such that the tracker is directed to point toward a target vehicle transmitting a signal, said tracking system comprising: a platform movable about elevation and azimuth axes; first and second antenna pairs positioned on said platform in parallel to said elevation and said azimuth axes, respectively; first means responsive to the phase difference between the target transmitted signal received on said first antenna pair for driving said platform about its elevation axis until the received signals are of identical phase whereby the elevation axis of said platform is directed normal to said target vehicle; second means responsive to the phase difference between the target transmitted signal received on said second antenna pair for driving said platform about its azimuth axis until the received signals are of identical phase whereby the azimuth axis of said platform is directed normal to said target vehicle; means for driving said narrow beamwidth tracker about its elevation axis to correspond to the elevation position of said movable platform; and means for driving said narrow beamwidth tracker about its azimuth axis to correspond to the azimuth axis position of said platform whereby said tracker is directed to point in parallel with said platform toward said target vehicle.

12. An electronic system responsive to a target vehicle transmitted signal for determining a vector direction to the vehicle and driving a narrow beamwidth tracking system in accordance therewith to point at said target vehicle, said electronic system comprising: a moveable platform; a plurality of antennas positioned on said platform, each antenna of said plurality of antennas receiving the signal transmitted by said target vehicle; means responsive to the phase differences of the signals received on said plurality of antennas for driving said platform until a zero phase difference exists between all of the signals received by said plurality of antennas whereby said platform points at said target; and means responsive to the position of said platform for driving said narrow beamwidth tracking system in correspondence thereto whereby said tracking system points to said target.

13. An electronic system responsive to a signal transmitted by target vehicle for determining a direction vector to the vehicle and furnishing driving information in accordance therewith to a narrow beamwidth tracking system such that said tracking system may be driven to point at said target vehicle, said system comprising: a platform moveable about first and second axes; first and second driving means responsive to first and second applied signals, respectively, for driving said platform about said first and second axes respectively; a plurality of combinations of antennas for receiving the signal transmitted by said target vehicle; means responsive to the phase differences between the signals received on a first combination of antennas of said plurality of combinations of antennas for applying driving signals to said first driving means until no phase differences exist between the signals received by said first combination of antennas whereby said platform is driven normal to said target vehicle about its first axis; second means responsive to the phase differences between the signals received on a second combination of antennas of said plurality of combinations of antennas for applying driving signals to said second driving means until no phase differences exist between the signals received by said second combination of antennas whereby said platform is driven normal to said target vehicle about its second axis; and means responsive to the position of said platform about its first and second axes for supplying corresponding axes information to said narrow beamwidth tracking system whereby said tracking system may be driven to point at said target vehicle.

References Cited in the file of this patent
UNITED STATES PATENTS

| 2,166,991 | Guanella | July 25, 1939 |
| 2,480,829 | Barrow | Sept. 6, 1949 |
| 2,964,266 | Fuchs | Dec. 13, 1960 |

OTHER REFERENCES

Aeronautical Engineering Review, May 1952, vol. 11, No. 5, pp. 71–73 relied on.